United States Patent Office 3,533,615
Patented Oct. 13, 1970

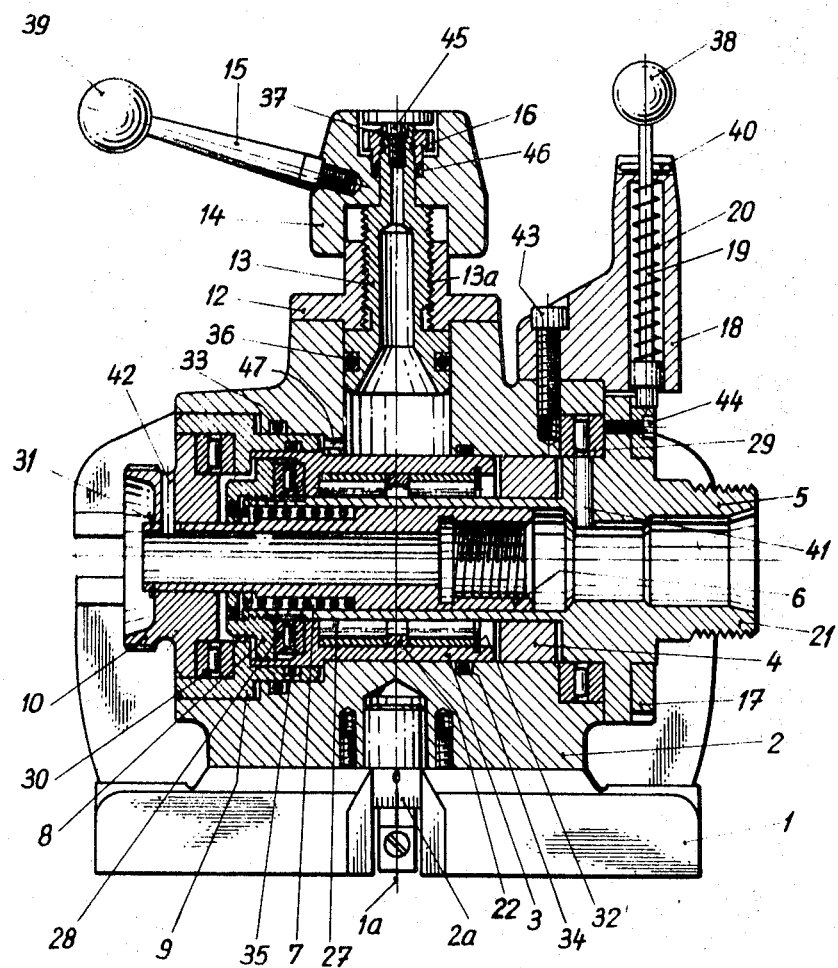
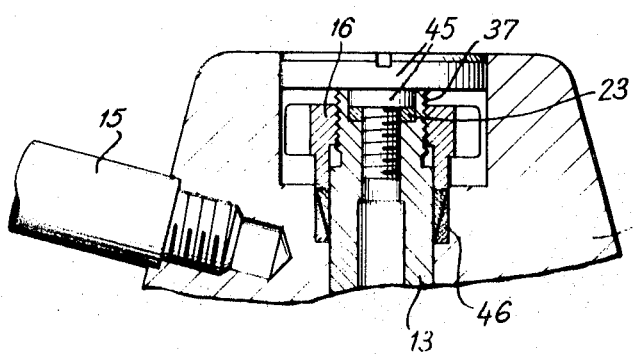

3,533,615
INDEXING ATTACHMENT INCORPORATING
A QUICK-ACTING HYDRAULIC CLAMPING
DEVICE
Ernst Schneider, Biel, Bern, Switzerland, assignor to
Peter Lehmann, Baerau, Switzerland
Filed Apr. 21, 1967, Ser. No. 632,608
Claims priority, application Switzerland, May 27, 1966,
78,066/66
Int. Cl. B23q 3/08
U.S. Cl. 269—25                                       6 Claims

ABSTRACT OF THE DISCLOSURE

The present invention is an indexing attachment incorporating a hydraulic quick-acting clamping device, including a rest formed with two clamping surfaces and a casing mounted on the rest for rotation about an axis normal to one of said clamping surfaces, which casing has mounted therein a spindle normal to said axis and adapted for rotation but not for axial movement, a hydraulically operable piston designed to act upon a tube and arranged coaxially of said spindle, with the cylinder of a second piston communicating through bores in the casing with the cylinder of said piston. The said second piston reciprocating in its cylinder by means of a screw device is adapted to be driven through a slipping clutch. The cylinder of said second piston is closed by a rigid bushing surrounding said spindle, which bushing has mounted thereon said first piston. At least two radial bearings are provided between the bushing and spindle in the area of the cylinder of said second piston and a pressure spring is provided to open the gripping collet.

---

A quick-acting clamping device of this type, which may be constructed in the form of an indexing attachment, is known. This device is formed with a two-part rest having two clamping surfaces. The rest has a casing secured thereto which can be rotated around an axis normal to one of the clamping surfaces. A holder for a workpiece receiving member, such as a gripping collet, is mounted for rotation in the casing. The known quick-acting clamping device comprises a hydraulically operating piston engaging a draw-in tube, said piston being axially movable, together with the draw-in tube and the workpiece receiving member, in relation to the holder, and a second spring-loaded piston mounted within a cylinder of the casing, the cylinder of both pistons being connected to each other so that in one of the positions of an indexing member the spring pressure exerted on the piston is transmitted through a hydraulic medium to the piston, whereas in the other position of this indexing member the hydraulic medium is in a pressureless condition, resulting in a no-load condition of the piston.

This device has various deficiencies:

The mounting of the holder is unsufficient so that the latter is liable to jamming in the bore of the casing, in particular whereby too forcefully operating the indexing member, which for the purpose of attaining an increased pressure is provided with two face tapers, an unnecessary high pressure was produced in the hydraulic system.

Moreover, it was found that the pressure exerted by a spring-loaded piston was uneven. The release of the workpiece from the gripping collet occurred after removal of the hydraulic pressure by the proper spring action of the gripping collet. This method of operation was too slow and also too unreliable.

The object of the present invention is to eliminate these deficiencies.

The invention will be more clearly understood by reference to the following detailed description when taken in connection with the accompanying drawing showing a preferred embodiment of the subject matter of the present invention.

FIG. 1 is a cross-sectional view of the apparatus according to the present invention; and FIG. 2 is an enlarged view of the manual control for a piston forming part of the present indexing attachment.

The indexing attachment comprises an angular rest 1 having two sides made of a single piece and forming two clamping surfaces normal to each other. A casing 2 is mounted for rotation in a manner known per se on one axis 1a of the rest 1 and has a graduated scale 2a provided thereon.

Casing 2 is formed with a continuous central bore normal to the axis 1a of rotation of the casing. This bore has located therein the work spindle 5 adapted for receiving a gripping collet not shown in the drawing. At the forward end of the spindle there is provided an external thread 21 which is adapted for threaded engagement with a clamping collet chuck, for instance. A cylindrical pin 41 is used to lock the gripping collet against rotation.

Two needle bearings 27 and a thrust bearing 29 are provided for mounting thereon the spindle 5. The needle bearings are held in position by means of a spacer ring 22 and a spring washer 32. The spindle 5 is locked against axial movement by a nut 8 threaded onto the rear end thereof. Another thrust bearing 28 is positioned between the nut 8 and a non-rotating bushing 3.

A first piston 9 having packings 33, 35 to seal it against the bore of the casing and against the bushing 3, respectively, is mounted for sliding on the bushing 3. The piston 9 is connected to a tube 6 through a ring 10. A thrust bearing 30 is interposed between ring 10 and piston 9. A spring washer 31 provides the connection between the ring 10 and the tube 6, the latter two being connected for rotation by a pin 42. The rear end of the ring 10 is adapted to form a control grip for rscrewing the gripping collet into the tube 6.

A compression spring 7 bears against a shoulder of the tube 6 and against the bottom of the ring nut 8, so as to lift the gripping collet automatically from its seating in the spindle 5 when the piston is in a pressureless condition.

In a cylinder normal to the spindle 5 a second piston 13 is provided having a packing ring 36. This cylinder communicates with the cylinder of the first piston 9 through bores 47 in the casing. The above-mentioned rigid bushing 3 which is sealed at 34, provides an inward seal for the cylinder of the piston 13.

The body of the piston 13 is formed with a thread 13a, so that the piston is moved back and forth by threaded engagement and disengagement with the cylinder head 12. A hand lever 14, 15, 39 is used for operating the piston 13, portion 14 of said lever being mounted for rotation on the shouldered end of the piston body and engaging over the cylinder head 12. The torque is transmitted by the lever 14, 15, 39 to the shank of the cylinder 13 by way of a slipping clutch 16, 46. This slipping clutch comprises two steel rings 46, the inner ring being provided with an inner cone surface opening upwardly and the outer ring having a complementary outer cone surface. A nut 16 screwed onto the screw socket 37 acts upon the upper steel ring. The maximum torque capable of being transmitted and, consequently, the maximum pressure of piston 13 can be adjusted by means of nut 16. Member 14 is sealed at the top by means of a washer 23 to make it dust-proof. A screw 45 inserted at the end of the piston body closes the filling hole for the hydraulic fluid.

The spindle 5 is adapted for easy rotation along with the gripping collect, the ejector 6, the nut 8 and the ring 10, all these members being mounted on roller bearings. Because of the novel type of mountings the hydraulic quick-acting clamping device 10, 13, 39 prevents these members from jamming.

The spindle 5 can be locked in position in a manner not shown in more details by means of the clamping ring 4.

An index plate 17 is secured by means of screws 44 to a flange at the forward end of spindle 5. A click-stop arrangement 18, 19, 20, 38, 40, 43 cooperates in a manner known per se with the index plate 17.

Obviously, various modifications of and changes in the invention hereinbefore set forth may be made without departing from the spirit and scope thereof, and therefore only such limitations should be imposed as are indicated in the appended claims.

I claim:

1. An indexing attachment incorporating a hydraulic quick-acting clamping device for receiving a gripping collet comprising a rest having two clamping surfaces, a casing mounted on said rest for rotation about an axis normal to one of said clamping surfaces, a spindle for receiving the gripping collet mounted in said casing normal to said axis and adapted for rotation, but not for axial movement, a tube slideably extending into said spindle and having a threaded bore for engagement with the gripping collet, a cylinder in said casing arranged coaxially of said spindle, a hydraulically operable piston designed to act upon said tube and arranged in said cylinder, a second piston, a cylinder for said second piston, bores in the casing joining said cylinders in communication, a screw device for reciprocating said second piston, operating means for operating said screw device including a slipping clutch, a rigid bushing surrounding said spindle and closing said second cylinder, said bushing having mounted thereon said first piston, at least two radial bearings being provided between said bushing and said spindle in the area of the cylinder of said second piston, and a pressure spring positioned against said tube for sliding the same to open the gripping collet.

2. The indexing attachment as set forth in claim 1, wherein the rest is made of an integral angular piece having clamping surfaces normal to each other, and wherein a scale adapted for rotation along with the casing cooperates with a zero mark on the rest.

3. The indexing attachment as set forth in claim 1, wherein in the slipping clutch includes two coaxial rings having conical friction surfaces which for the purpose of adjusting the maximum torque by means of a nut are adapted to be pressed against each other.

4. An indexing attachment as claimed in claim 1, wherein said pressure spring is disposed between said spindle and said tube and bears at one end against said tube and a ring nut screwed onto said spindle having the other end of said spring bearing thereagainst, said ring nut holding said spindle securely in its axial position.

5. An indexing attachment as claimed in claim 1 including a ring connecting said tube to said first piston and a thrust bearing interposed between said ring and said first piston.

6. An indexing attachment as claimed in claim 4, including a non-rotating bushing between said spindle and said casing and a thrust bearing provided between said ring nut and said rigid bushing.

References Cited

UNITED STATES PATENTS

| 2,803,157 | 8/1957 | Seitter | 269—29 |
| 2,877,691 | 3/1959 | Shurina | 279—5 |
| 3,087,736 | 5/1963 | Lukas | 279—4 |

ROBERT C. RIORDON, Primary Examiner

D. R. MELTON, Assistant Examiner

U.S. Cl. X.R.

279—5